United States Patent
Kato et al.

(10) Patent No.: US 10,854,892 B2
(45) Date of Patent: Dec. 1, 2020

(54) FUEL CELL STACK HAVING IMPROVED JOINING STRENGTH BETWEEN SEPARATORS

(71) Applicant: TOYOTA JIDOSHA KABUSHIKI KAISHA, Toyota (JP)

(72) Inventors: Manabu Kato, Toyota (JP); Haruyuki Aono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/216,124

(22) Filed: Dec. 11, 2018

(65) Prior Publication Data

US 2019/0245217 A1    Aug. 8, 2019

(30) Foreign Application Priority Data

Feb. 8, 2018    (JP) .................................. 2018-021293

(51) Int. Cl.
*H01M 8/026*        (2016.01)
*H01M 8/1004*     (2016.01)

(52) U.S. Cl.
CPC ......... *H01M 8/026* (2013.01); *H01M 8/1004* (2013.01)

(58) Field of Classification Search
CPC ........................... H01M 8/026; H01M 8/1004
See application file for complete search history.

(56) References Cited

U.S. PATENT DOCUMENTS

| 2008/0206617 | A1  | 8/2008 | Okada et al. |
| 2009/0053571 | A1  | 2/2009 | Takata et al. |
| 2009/0092872 | A1  | 4/2009 | Miyazawa et al. |
| 2017/0279131 | A1* | 9/2017 | Poirot-Crouvezier ..................... H01M 8/0265 |

FOREIGN PATENT DOCUMENTS

| JP | 2006-294453 A | 10/2006 |
| JP | 2007-311069 A | 11/2007 |
| JP | 2007-311081 A | 11/2007 |
| JP | 2014-175208 A | 9/2014 |

\* cited by examiner

*Primary Examiner* — Jimmy Vo
(74) *Attorney, Agent, or Firm* — Dickinson Wright PLLC

(57) ABSTRACT

A fuel cell stack includes: a membrane electrode assembly; and first and second separators joined to each other, wherein first and third fluid groove portions face each other in a stacking direction in which the membrane electrode assembly and the first and second separators are stacked, second and fourth fluid groove portions face each other in the stacking direction, and first and second coolant groove portions face each other in the stacking direction and define a common coolant flow path.

13 Claims, 7 Drawing Sheets

FUEL CELL STACK HAVING IMPROVED JOINING STRENGTH BETWEEN SEPARATORS

CROSS-REFERENCE TO RELATED APPLICATION

This application is based upon and claims the benefit of priority of the prior Japanese Patent Application No. 2018-021293, filed on Feb. 8, 2018, the entire contents of which are incorporated herein by reference.

TECHNICAL FIELD

The present disclosure relates to a fuel cell stack.

BACKGROUND

There is known a fuel cell stack in which membrane electrode assemblies and pairs of two separators joined to each other are alternately stacked. A gas groove portion along which reaction gas flows is formed on each surface of the separators in a side facing the membrane electrode assembly, and a coolant groove portion along which coolant flows is formed on each opposite surface. For example, in Japanese Unexamined Patent Application Publication No. 2014-175208, a part, in which the groove width of the gas groove portion is partially increased in one of the two separators, is joined to a part in which the groove width of the gas groove portion is partially increased in the other separator. This ensures the joining strength between the separators.

As for Japanese Unexamined Patent Application Publication No. 2014-175208, a part of a coolant groove portion adjacent to the part in which the groove width of the gas groove portion is partially increased is narrowed by the increased amount of the groove width of the gas groove portion. Therefore, the pressure loss of the coolant might be increased in the part, and then the cooling performance of the fuel cell stack might be degraded.

SUMMARY

It is an object of the present disclosure to provide a fuel cell stack ensuring joining strength between separators and suppressing pressure loss of coolant.

The above object is achieved by a fuel cell stack including: a membrane electrode assembly; and first and second separators joined to each other, wherein the membrane electrode assembly and the first and second separators are stacked, the first separator includes: a first coolant groove portion along which coolant flows on a side of the second separator facing the first separator; and first and second fluid groove portions along which a first reaction fluid flows on a side opposite to the second separator facing the first separator, the first and second fluid groove portions being adjacent to each other through the first coolant groove portion and extending along the first coolant groove portion, the second separator includes: a second coolant groove portion along which the coolant flows on a side of the first separator facing the second separator; and third and fourth fluid groove portions along which a second reaction fluid flows on a side opposite to the first separator facing the second separator, and the third and fourth fluid groove portions being adjacent to each other through the second coolant groove portion and extending along the second coolant groove portion, the first and third fluid groove portions face each other in a stacking direction in which the membrane electrode assembly and the first and second separators are stacked, the second and fourth fluid groove portions face each other in the stacking direction, the first and second coolant groove portions face each other in the stacking direction and define a common coolant flow path, the first fluid groove portion includes a wide portion in which a groove width of the first fluid groove portion is partially increased, the second fluid groove portion includes a narrow portion in which a groove width of the second fluid groove portion is partially decreased, the wide portion of the first fluid groove portion is joined to the third fluid groove portion, a groove width of a part of the third fluid groove portion joined to the wide portion of the first fluid groove portion is greater than a groove width of a part of the first fluid groove portion other than the wide portion of the first fluid groove portion, and the wide portion of the first fluid groove portion is adjacent to the narrow portion of the second fluid groove portion through the first coolant groove portion.

The groove width of the part of the third fluid groove portion to which the wide portion of the first fluid groove portion is joined is greater than that of the part of the first fluid groove portion other than the wide portion thereof. This ensures an area of a part, joined to the third fluid groove portion, of the wide portion in which the groove width of the first fluid groove portion is partially increased, and the joining strength between the first and second separators. In addition, the wide portion of the first fluid groove portion is adjacent to the narrow portion of the second fluid groove portion through the first coolant groove portion, which ensures the groove width of the first coolant groove portion, thereby suppressing the pressure loss of the coolant.

A groove width of the wide portion of the first fluid groove portion may be equal to or greater than the groove width of the part of the third fluid groove portion joined to the wide portion of the first fluid groove portion.

The narrow portion of the second fluid groove portion may be shallower than a part of the second fluid groove portion other than the narrow portion of the second fluid groove portion.

The first fluid groove portion may include a narrow portion in which the groove width of the first fluid groove portion is partially decreased, the second fluid groove portion may include a wide portion in which the groove width of the second fluid groove portion is partially increased, and the wide portion of the second fluid groove portion may be adjacent to the narrow portion of the first fluid groove portion through the first coolant groove portion.

The narrow portion of the first fluid groove portion may be shallower than a part of the first fluid groove portion other than the narrow portion of the first fluid groove portion.

The third fluid groove portion may include a wide portion in which a groove width of the third fluid groove portion is partially increased, the fourth fluid groove portion may include a narrow portion in which a groove width of the fourth fluid groove portion is partially decreased, the part of the third fluid groove portion joined to the wide portion of the first fluid groove portion may be the wide portion of the third fluid groove portion, and the wide portion of the third fluid groove portion may be adjacent to the narrow portion of the fourth fluid groove portion through the second coolant groove portion.

The wide portions of the first fluid groove portion may be provided, the narrow portions of the second fluid groove portion may be provided, all of the wide portions of the first fluid groove portion may be joined to the third fluid groove portion, each of the groove widths of parts of the third fluid groove portion respectively joined to the wide portions of the first fluid groove portion may be greater than the groove width of the part of the first fluid groove portion other than the wide portions of the first fluid groove portion, and the wide portions of the first fluid groove portion may be respectively adjacent to the narrow portions of the second fluid groove portion through the first coolant groove portion.

The narrow portions of the first fluid groove portion may be provided, the wide portions of the second fluid groove portion may be provided, all of the wide portions of the second fluid groove portion may be joined to the fourth fluid groove portion, each of groove widths of parts of the fourth fluid groove portion respectively joined to the wide portions of the second fluid groove portion may be greater than a groove width of a part of the second fluid groove portion other than the wide portions of the second fluid groove portion, and the wide portions of the second fluid groove portion may be respectively adjacent to the narrow portions of the first fluid groove portion through the first coolant groove portion.

The first reaction fluid may be anode gas, the second reaction fluid may be cathode gas, the third and fourth fluid groove portions may include: an upstream region positioned in an upstream side of the cathode gas with respect to a middle point bisecting a length of the third or fourth fluid groove portion in an extending direction of the third and fourth fluid groove portions, and a downstream region positioned in a downstream side of the cathode gas with respect to the middle point, and the wide portion of the first fluid groove portion may be joined to the upstream region.

The first reaction fluid may be anode gas, the second reaction fluid may be cathode gas, the third and fourth fluid groove portions may include: an upstream region positioned in an upstream side of the cathode gas with respect to a middle point bisecting a length of the third or fourth fluid groove portion in an extending direction of the third and fourth fluid groove portions, and a downstream region positioned in a downstream side of the cathode gas with respect to the middle point, and the wide portion of the first fluid groove portion and the wide portion of the second fluid groove portion may be joined to the upstream region.

The first fluid groove portion may include other wide portions in which the groove width of the first fluid groove portion is partially increased, the second fluid groove portion may include other narrow portions in which the groove width of the second fluid groove portion is partially decreased, the other wide portions of the first fluid groove portion may be respectively adjacent to the other narrow portions of the second fluid groove portion through the first coolant groove portion, at least any one of the other wide portions of the first fluid groove portion may be joined to the third fluid groove portion, and a total number, of the wide portion of the first fluid groove portion joined to the third fluid groove portion, and the other wide portions of the first fluid groove portion joined to the third fluid groove portion, may be greater in the upstream region than in the downstream region.

The first fluid groove portion may include other narrow portions in which the groove width of the first fluid groove portion is partially decreased, the second fluid groove portion may include other wide portions in which the groove width of the second fluid groove portion is partially increased, the other wide portions of the second fluid groove portion may be respectively adjacent to the other narrow portions of the first fluid groove portion through the first coolant groove portion, at least any one of the other wide portions of the second fluid groove portion may be joined to the fourth fluid groove portion, and a total number, of the wide portion of the first fluid groove portion joined to the third fluid groove portion, the wide portion of the second fluid groove portion joined to the fourth fluid groove portion, and the other wide portions of the second fluid groove portion joined to the fourth fluid groove portion, may be greater in the upstream region than in the downstream region.

The wide portions of the first fluid groove portion may be provided, the narrow portions of the second fluid groove portion may be provided, the narrow portions of the first fluid groove portion may be provided, the wide portions of the second fluid groove portion may be provided, the wide portions of the first fluid groove portion may be respectively adjacent to the narrow portions of the second fluid groove portion through the first coolant groove portion, the narrow portions of the first fluid groove portion may be respectively adjacent to the wide portions of the second fluid groove portion through the first coolant groove portion, the wide portions of the first fluid groove portion and the narrow portions of the first fluid groove portion may be alternately provided in an extending direction of the first fluid groove portion, and the wide portions of the second fluid groove portion and the narrow portions of the second fluid groove portion may be alternately provided in an extending direction of the second fluid groove portion.

DETAILED DESCRIPTION

Figure 1:
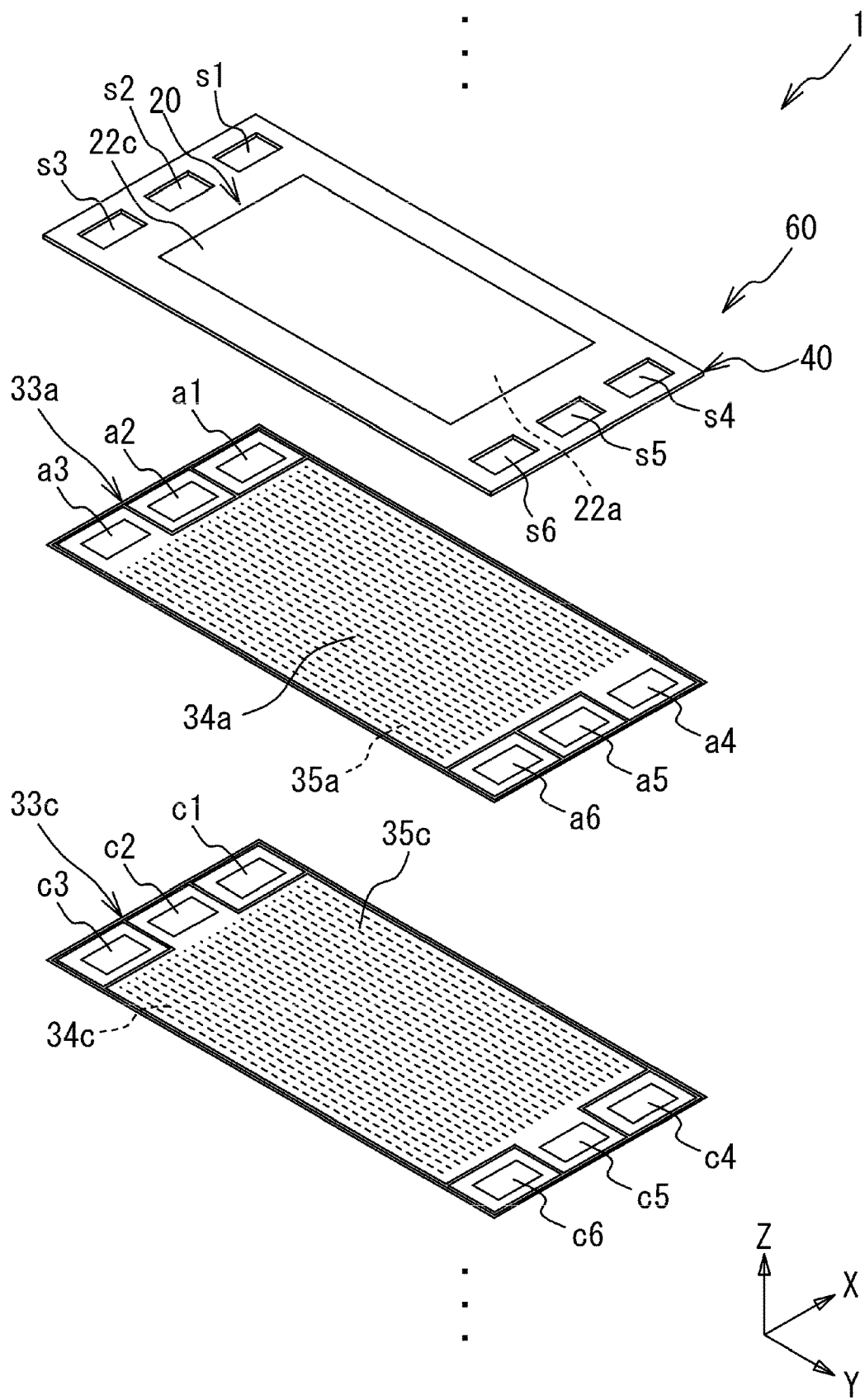
FIG. 1 is an exploded perspective view of a unit cell of a fuel cell stack.

FIG. 1 is an exploded perspective view of a unit cell 60 of a fuel cell stack (hereinafter referred to as a stack) 1. The stack 1 is configured by stacking the unit cells 60. In FIG. 1, only one unit cell 60 is illustrated, and other unit cells are omitted. The unit cell 60 is stacked together with other unit cells in the Z direction illustrated in FIG. 1. The unit cell 60 has a substantially rectangular shape. The longitudinal direction and the short direction of the unit cell 60 respectively correspond to the Y direction and the X direction illustrated in FIG. 1.

The stack 1 is a polymer electrolyte fuel cell that generates electric power with supplied anode gas (for example, hydrogen) and cathode gas (for example, oxygen) as reaction fluids. The unit cell 60 includes a membrane electrode gas diffusion layer assembly 20 (hereinafter referred to as MEGA (Membrane Electrode Gas diffusion layer Assembly)), an anode separator 33*a*, and a cathode separator 33*c* (hereinafter referred to as separators). The separators 33*a* and 33*c* are joined to each other as will be described later in detail. In the stack 1, the MEGAs 20 respectively held by frame members 40 and pairs of the separators 33*a* and 33*c* joined to each other are alternately stacked. The separators 33*a* and 33*c* are examples of first and second separators joined to each other. The anode gas and the cathode gas are examples of first and second reaction fluids, respectively.

The MEGA 20 includes an anode gas diffusion layer 22*a* and a cathode gas diffusion layer 22*c* (hereinafter referred to as diffusion layers). The frame member 40, made of a resin with insulating property, is formed into a substantially frame shape. The MEGA 20 is joined to an inner peripheral edge side of the frame member 40. Holes s1 to s3 are formed along one side of two short sides of the frame member 40, and holes s4 to s6 are formed along the other side. Similarly, holes a1 to a3 are formed along one side of two short sides of the separator 33*a*, and holes a4 to a6 are formed along the other side. Holes c1 to c3 are formed along one side of two short sides of the separator 33*c*, and holes c4 to c6 are formed along the other side. The holes s1, a1, and c1, communicating with one another, define a cathode inlet manifold. Similarly, the holes s2, a2, and c2 define a coolant inlet manifold. The holes s3, a3, and c3 define an anode outlet manifold. The holes s4, a4, and c4 define an anode inlet manifold. The holes s5, a5, and c5 define a coolant outlet manifold. The holes s6, a6, and c6 define a cathode outlet manifold. Liquid cooling water is used as a coolant.

Anode groove portions 34*a* along which the anode gas flows are formed on a surface of the separator 33*a* facing the MEGA 20 so as to communicate between the anode inlet and outlet manifolds. Coolant groove portions 35*a* and 35*c* along which the coolant flows are respectively formed on the other surface opposite to the anode groove portions 34*a* of the separator 33*a* and on a surface of the separator 33*c* facing the separator 33*a* so as to communicate between the coolant inlet and outlet manifolds. Cathode groove portions 34*c* along which the cathode gas flows are formed on the other surface of the separator 33*c* opposite to the coolant groove portions 35*c* so as to communicate between the cathode inlet and outlet manifolds. The anode groove portions 34*a* and the coolant groove portions 35*a* extend in the longitudinal direction (Y direction) of the separator 33*a*. Similarly, the cathode groove portions 34*c* and the coolant groove portions 35*c* extend in the longitudinal direction (Y direction) of the separator 33*c*. The separators 33*a* and 33*c*, each made of a material with gas blocking property and electro-conductivity, are thin plate shaped members formed of a metal such as pressed stainless steel, titanium or titanium alloy.

Figure 2A:
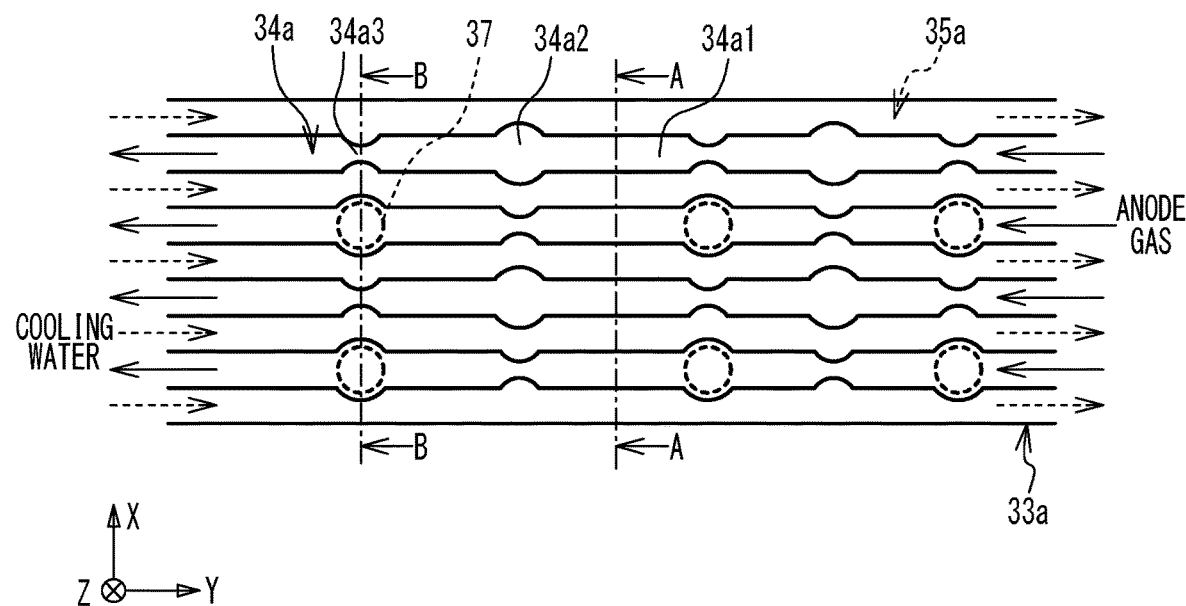
FIGS. 2A and 2B are explanatory views of separators, respectively.
Figure 2B:
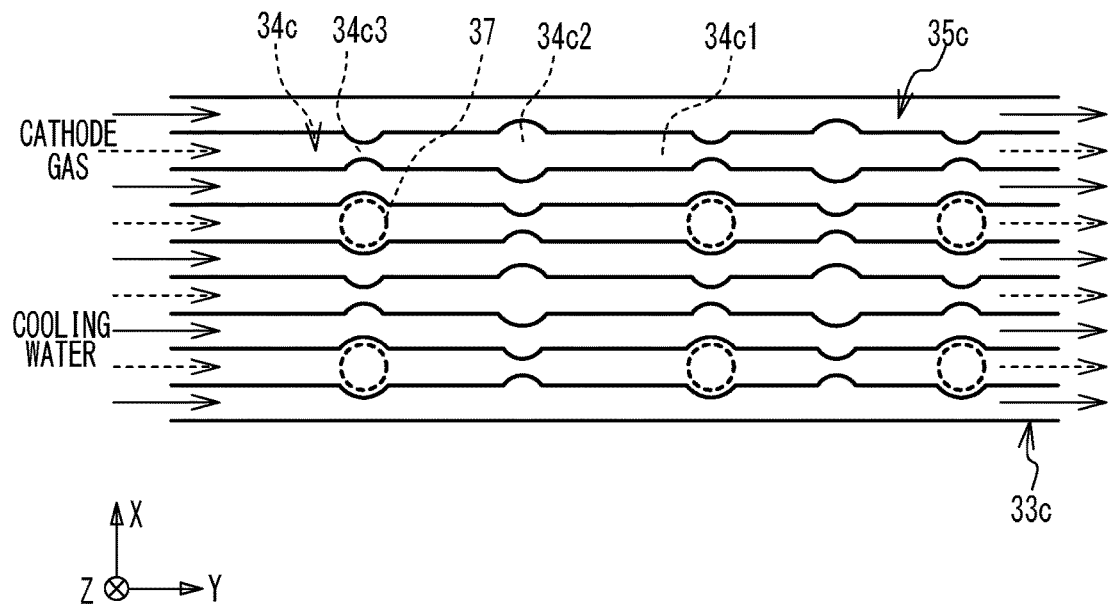
Figure 3A:
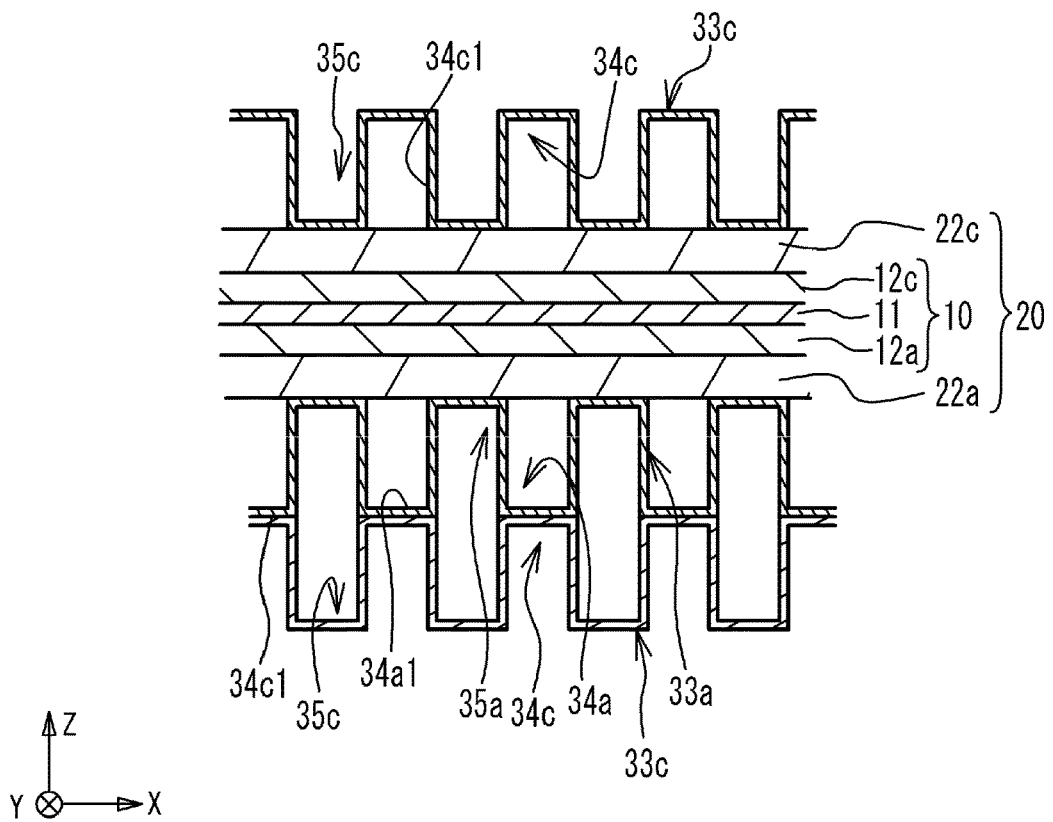
FIG. 3A is a partially cross-sectional view of the unit cell at a part corresponding to line A-A in FIG. 2A.
Figure 3B:
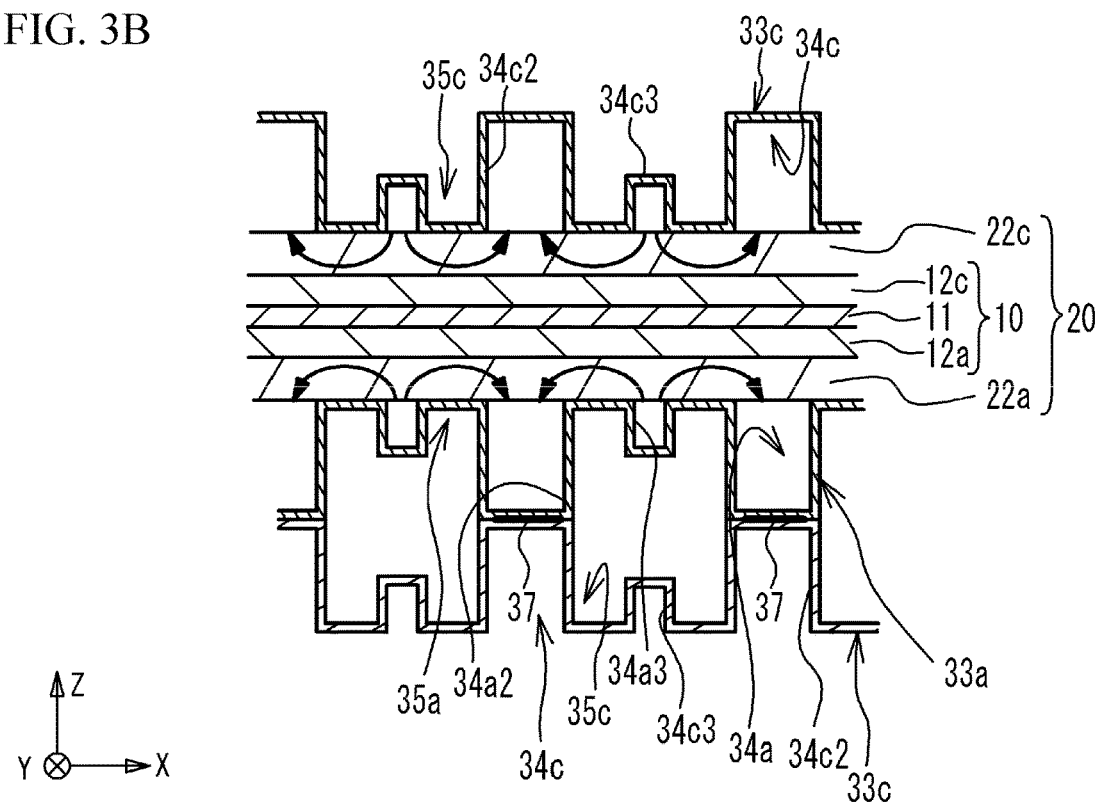
FIG. 3B is a partially cross-sectional view of the unit cell at a part corresponding to line B-B in FIG. 2A.

FIGS. 2A and 2B are explanatory views of the separators 33*a* and 33*c*, respectively. FIG. 2A illustrates the separator 33*a* of the unit cell 60 when viewed from the MEGA 20 in the −Z direction. FIG. 2B illustrates the separator 33*c* of the unit cell 60 when viewed from the separator 33*a* in the −Z direction. FIG. 3A is a partially cross-sectional view of the unit cell 60 at a part corresponding to line A-A in FIG. 2A. FIG. 3B is a partially cross-sectional view of the unit cell 60 at a part corresponding to line B-B in FIG. 2A. FIGS. 3A and 3B illustrate partially cross sections perpendicular to the longitudinal direction of the unit cell 60. FIGS. 3A and 3B illustrates not only one unit cell 60 but also another unit cell separator 33*c* stacked above the unit cell 60. Before describing the shape of the separator 33*a*, the configuration of the MEGA 20 will be described with reference to FIG. 3A.

The MEGA 20 includes the above-described diffusion layers 22*c* and 22*a* and a membrane electrode assembly (hereinafter referred to as MEA) 10. The MEA 10 includes an electrolyte membrane 11 having a substantially rectangular shape, and a cathode-side catalyst layer 12*c* and a anode-side catalyst layer 12*a* (hereinafter referred to as "catalysts") formed respectively on the upper surface and the lower surface of the electrolyte membrane 11 in FIGS. 3A and 3B. The electrolyte membrane 11 is a solid polymer thin film exhibiting high proton conductivity in a wet state, and is, for example, a fluorine-based ion exchange membrane. The catalyst layers 12*c* and 12*a* are formed by applying an ink, containing a carbon carrier carrying platinum (Pt) or the like and an ionomer having proton conductivity, to the electrolyte membrane 11 and then by drying. The diffusion layers 22*c* and 22*a* are joined to the catalyst layers 12*c* and 12*a*, respectively. The diffusion layers 22*c* and 22*a* are formed of a material with gas permeability and electro-conductivity, for example, a porous fibrous base material such as carbon fiber and graphite fiber.

Each of the separators 33*a* and 33*c* is formed into a wavy shape, in which depressions and projections in the X direction are arranged in cross section viewed in the Y direction. Firstly, a brief outline of the separator 33*a* will be described. The anode groove portions 34*a* and the coolant groove portions 35*a*, inseparably formed on two sides of the separator 33*a*, are alternately arranged in the X direction. Therefore, the two anode groove portions 34*a* are adjacent through the coolant groove portion 35*a*. When viewed in the Y direction, the anode groove portion 34*a* projects in the −Z direction away from the diffusion layer 22*a* facing the anode groove portion 34*a*. When viewed in the Y direction, the coolant groove portion 35*a* projects in the direction opposite to the direction in which the anode groove portion 34*a* projects, and contacts with the diffusion layer 22*a* facing the coolant groove portion 35*a*. The anode groove portion 34*a* is defined by both side surfaces substantially perpendicular to the X direction and a bottom surface substantially perpendicular to the Z direction. The bottom surface is positioned between both side surfaces and away from the diffusion layer 22*a*. The coolant groove portion 35*a* is defined by both side surfaces substantially perpendicular to the X direction and an upper surface substantially perpendicular to the Z direction. The upper surface is in contact with the diffusion layer 22*a*. As for the anode groove portion 34*a* and the coolant groove portion 35*a* adjacent to each other, one of both side surfaces of the anode groove portion 34*a* and one of both side surfaces of the coolant groove portion 35*a* are defined by a common wall portion.

Next, a brief outline of the separator 33*c* will be described. Similarly, the cathode groove portions 34*c* and the coolant groove portions 35*c* are formed into a wavy shape, in which depressions and projections in the X direction are arranged in cross section viewed in the Y direction. The cathode groove portions 34*c* and the coolant groove portions 35*c*, inseparably formed on two sides of the separator 33*c*, are alternately arranged in the X direction. Therefore, the two cathode groove portions 34*c* are adjacent through the coolant groove portion 35*c*. The cathode groove portion 34*c* projects in the +Z direction when viewed in the Y direction. The coolant groove portion 35*c* projects in the −Z direction when viewed in the Y direction. As for the separator 33*c* facing the MEGA 20 in FIG. 3A, the cathode groove portion 34*c* is away from the diffusion layer 22*c*, and the coolant groove portion 35*c* is in contact with the diffusion layer 22*c*. Further, as for the separator 33*c* facing the separator 33*a* in FIG. 3A, the cathode groove portion 34*c* projects and contacts with the anode groove portion 34a of the separator 33a, and the coolant groove portion 35c projects away from the separator 33a. Further, the coolant groove portion 35c faces the coolant groove portion 35a of the separator 33a and defines a common coolant flow path. The cathode groove portion 34c is defined by both side surfaces substantially perpendicular to the X direction and an upper surface substantially perpendicular to the Z direction. The upper surface is positioned between both side surfaces and away from the diffusion layer 22c facing the separator 33c. The coolant groove portion 35c is defined by both side surfaces substantially perpendicular to the X direction and a bottom surface substantially perpendicular to the Z direction. The bottom surface is in contact with the diffusion layer 22c facing the separator 33c. As for the cathode groove portion 34c and the coolant groove portion 35c adjacent to each other, one of both side surfaces of the cathode groove portion 34c and one of both side surfaces of the coolant groove portion 35c are defined by a common wall portion.

The coolant groove portion 35a is an example of a first coolant groove portion along which the coolant flows on a side of the separator 33a facing the separator 33c. The two anode groove portions 34a arranged side by side in the X direction are an example of first and second fluid groove portions along which the anode gas flows on a side opposite to the separator 33c facing the separator 33a, and the first and second fluid groove portions are adjacent to each other through the coolant groove portion 35a and extend along the coolant groove portion 35a. The coolant groove portion 35c is an example of a second coolant groove portion along which the coolant flows on a side of the separator 33c facing the separator 33a. The two cathode groove portions 34c arranged side by side in the X direction are an example of third and fourth fluid groove portions along which the cathode gas flows on a side opposite to the separator 33a facing the separator 33c, and the third and fourth fluid groove portions are adjacent to each other through the coolant groove portion 35c and extend along the coolant groove portion 35c.

Next, the separator 33a will be described in detail with reference to FIG. 2A. In the separator 33a, the anode groove portions 34a, adjacent to each other in the X direction, extend in the Y direction. Each of the anode groove portions 34a is provided with constant width portions 34a1, wide portions 34a2, and narrow portions 34a3. Since these portions are repeatedly and continuously formed, some reference numerals are omitted in FIG. 2A. Specifically, the constant width portion 34a1, the wide portion 34a2, the constant width portion 34a1, the narrow portion 34a3, the constant width portion 34a1 . . . are continuous in the extending direction of the anode groove portion 34a. In other words, the wide portions 34a2 and the narrow portions 34a3 are alternately provided at predetermined intervals in the extending direction of the anode groove portion 34a. A groove width of the wide portion 34a2 is greater than that of the constant width portion 34a1. A groove width of the narrow portion 34a3 is smaller than that of the constant width portion 34a1. The wide portion in one of the two adjacent anode groove portions 34a is adjacent to the narrow portion in the other thereof in the X direction. Similarly, the narrow portion 34a3 in one of the two adjacent anode groove portions 34a is adjacent to the wide portion in the other thereof in the X direction. The constant width portion 34a1 in one of the two adjacent anode groove portions 34a is adjacent to the constant width portion in the other thereof in the X direction.

As illustrated in FIG. 2A, both side surfaces of the constant width portion 34a1 extend linearly in parallel to each other. Both side surfaces of the wide portion 34a2, each formed into a circular arc shape, extend once away from each other and again close to each other in the extending direction of the anode groove portion 34a. Both side surfaces of the narrow portion 34a3, each formed into a circular arc shape, extend once close to each other and again away from each other in the extending direction of the anode groove portion 34a. The anode gas flows in the −Y direction indicated by the solid arrow in FIG. 2A, and the cooling water flows in the +Y direction indicated by the dotted arrow.

Next, the separator 33c will be described in detail with reference to FIG. 2B. Similarly to the separator 33a, in the separator 33c, the cathode groove portions 34c adjacent to each other in the X direction extend in the Y direction as illustrated in FIG. 2B. Each of the cathode groove portions 34c is provided with constant width portions 34c1, wide portions 34c2, and narrow portions 34c3. The cathode gas flows in the +Y direction indicated by the dotted arrow in FIG. 2B, and the cooling water flows in the +Y direction indicated by the solid arrow. The cathode groove portion 34c is formed into a shape obtained by inverting the shape of the anode groove portion 34a. Accordingly, in a state where the separators 33a and 33c are stacked, the constant width portion 34c1, the wide portion 34c2, and the narrow portion 34c3 respectively face the constant width portion 34a1, the wide portion 34a2, and the narrow portion 34a3 of the anode groove portion 34a. The above described shapes of the wide portions 34a2 and 34c2 and the narrow portions 34a3 and 34c3 are merely examples and are not limited thereto.

As for the separators 33a and 33c facing each other, the constant width portions 34a1 and 34c1 are in contact with each other as illustrated in FIG. 3A, and the wide portions 34a2 and 34c2 are in contact with each other as illustrated in FIG. 3B. Specifically, the bottom surface of the constant width portion 34a1 and the upper surface of the constant width portion 34c1 are in contact with each other, and the bottom surface of the wide portion 34a2 and the upper surface of the wide portion 34c2 are in contact with each other. As illustrated in FIGS. 2A and 2B, there are plural points where the wide portions 34a2 and 34c2 are in contact with each other, and some of them where joining portions 37 are provided. The joining portion 37 joins the wide portions 34a2 and 34c2. The separators 33a and 33c are joined by the joining portions 37 formed in such plural points. The wide portions 34a2 and 34c2 are joined to each other in such a way, thereby ensuring an area of the joining portion 37 and ensuring the joining strength between the separators 33a and 33c. The joining method may be any of thermoplastic bonding, thermosetting bonding, ultrasonic welding, electron beam welding, arc welding, brazing, resistance welding, cold welding, vibration welding, and the like. However, from the viewpoint of reducing the contact resistance between the separators 33a and 33c, it is preferable to directly join the separators 33a and 33c as electric conductors by ultrasonic welding, electron beam welding, arc welding, brazing, resistance welding, cold welding, vibration welding, and the like.

As illustrated in FIGS. 2A and 2B, some of the contact points between the wide portions 34a2 and 34c2 are joined by the joint portion 37. Therefore, the joining strength between the separators 33a and 33c is ensured while simplifying the joining process. The joining portion 37 may join the wide portions 34a2 and 34c2 in contact with each other and positioned at one end in the Y direction, and the joining portion 37 may join the wide portions 34a2 and 34c2 in contact with each other and positioned at the other end in the Y direction. In this case, a few joining points effectively ensure the joining strength between the separators 33a and 33c.

As described above, the wide portion 34a2 in one of the two adjacent anode groove portions 34a is adjacent to the narrow portion of the other thereof in the X direction. As for the side surface of the wide portion 34a2 and the side surface of the narrow portion adjacent to each other in the wide portion 34a2 and the narrow portion adjacent to each other, the side surface of the wide portion 34a2 is curved so as to reduce the groove width of the coolant groove portion 35a, whereas the side surface of the narrow portion facing the side surface of the wide portion 34a2 is curved so as to increase the groove width of the coolant groove portion 35a. This ensures the groove width of the coolant groove portion 35a defined by the side surfaces of the wide portion 34a2 and the narrow portion adjacent to each other, and suppresses the pressure loss of the cooling water. The same applies to the coolant groove portions 35c of the separator 33c.

As illustrated in FIGS. 2A and 3B, the wide portion 34a2 in one of the two adjacent anode groove portions 34a is adjacent to the narrow portion in the other thereof. Herein, the cross sectional area perpendicular to the flowing direction in the anode groove portion 34a is the largest in the wide portion 34a2 and is the smallest in the narrow portion. Therefore, the pressure loss of the anode gas flowing along the anode groove portion 34a increases in the narrow portion. For this reason, a part of the anode gas that seldom flows along the narrow portion 34a3 flows into the wide portion 34a2 of the adjacent anode groove portion through the diffusion layer 22a. As a result, the anode gas easily flows in the vicinity of the catalyst layer 12a, thereby improving the power generation performance. Likewise, since the separator 33c includes the adjacent wide portions 34c2 and the narrow portions, the cathode gas easily flows in the vicinity of the catalyst layer 12c, thereby improving the power generation performance.

As illustrated in FIG. 2A, the adjacent wide portions 34a2 and narrow portions are arranged in the flowing direction of the anode gas. Thus, the anode gas easily flows over the entire surface of the catalyst layer 12a, thereby suppressing the non-uniform distribution of the power generation. On the downstream side with respect to the position where the wide portion 34a2 in one of the two adjacent anode groove portions 34a is adjacent to the narrow portion in the other thereof, the narrow portion 34a3 in one of the two adjacent anode groove portions is adjacent to the wide portion in the other thereof. Therefore, on the upstream side of the position where the wide portion 34a2 in one of the two adjacent anode groove portions 34a is adjacent to the narrow portion of the other thereof, the anode gas is promoted to flow to one from the other thereof. Further, on the upstream side of the position where the narrow portion 34a3 in one of the two adjacent anode groove portions is adjacent to the wide portion in the other thereof, the anode gas is promoted to flow from one to the other thereof. On the upstream side, the anode gas is promoted to flow to the wide portion 34a2 in one of the two adjacent anode groove portions from the narrow portion in the other thereof. On the downstream side, the anode gas is promoted to flow from the narrow portion 34a3 in one of the two adjacent anode groove portions to the wide portion in the other thereof. This also suppresses the non-uniform distribution of the power generation. Furthermore, the wide portions 34a2 and the narrow portions 34a3 are alternately provided in the same anode groove portion 34a, thereby also suppressing the non-uniform distribution of the power generation. Likewise, in the separator 33c, the adjacent wide portion 34c2 and narrow portion are provided at positions in the flowing direction of the cathode gas. Further, on the downstream side with respect to the position where the wide portion 34c2 in one of the two adjacent cathode groove portions 34c is adjacent to the narrow portion in the other thereof, the narrow portion 34c3 in one thereof is adjacent to the wide portion in the other thereof. Furthermore, the wide portions 34c2 and the narrow portions 34c3 are alternately provided in the same cathode groove portion 34c. This also suppresses the non-uniform distribution of the power generation.

Further, as illustrated in FIGS. 3A and 3B, the narrow portion 34a3 is shallower than the other portion, in particular, the constant width portions 34a1 and the wide portions 34a2. This facilitates production in pressing, carbon molding and the like, and maintains the production efficiency. For example, in a case of producing the separator 33a by pressing, the narrow portion 34a3 is narrow but shallow, thereby suppressing an increase in the expansion amount of the material by pressing. As a result, an increase in the number of pressing processes is suppressed, and then the production is facilitated. Further, in a case of producing the separator 33a by carbon molding, the narrow portion 34a3 is narrow but shallow, thereby facilitating producing a mold and prolonging the life of the mold. This makes it possible to maintain the production efficiency of the separator 33a. The same applies to the separator 33c.

As illustrated in FIG. 3A, since the constant width portions 34a1 and 34c1 facing each other are in contact with each other, the two adjacent coolant groove portions 35a are separated by the constant width portion 34a1. Likewise, the two adjacent coolant groove portions 35c are separated by the constant width portion 34c1. However, as illustrated in FIG. 3B, the narrow portions 34a3 and 34c3 facing each other are not in contact with each other, and the two adjacent coolant groove portions 35a meet the two adjacent coolant groove portions 35c. Therefore, for example, even when a foreign matter is caught around such narrow portions 34a3 and 34c3 facing each other within the coolant groove portions 35a and 35c, the flow rate of the cooling water is ensured.

Although the narrow portion 34a3 is shallower than each of the constant width portion 34a1 and the wide portion 34a2, it is not limited thereto. For example, the depth of the narrow portion 34a3 may be substantially the same as each depth of the constant width portion 34a1 and the wide portion 34a2. The same applies to the narrow portion 34c3. Thus, the bottom surface of the narrow portion 34a3 and the upper surface of the narrow portion 34c3 may contact with each other. Accordingly, the number of contact points between the separators 33a and 33c increases, thereby reducing the electrical contact resistance.

In the present embodiment, the groove widths of the constant width portions 34a1 and 34c1 are substantially the same, but not limited thereto. For example, in a case of using hydrogen gas as the anode gas and using oxygen-containing air as the cathode gas, the amount of the cathode gas required for the power generation reaction is larger than that of the anode gas required therefor. Therefore, in order to correspond to the amount of the cathode gas, the groove width of the constant width portion 34c1 is made greater than that of the constant width portion 34a1, which effectively supplies a larger amount of cathode gas to the catalyst layer 12c in the cathode side.

Figure 4A:
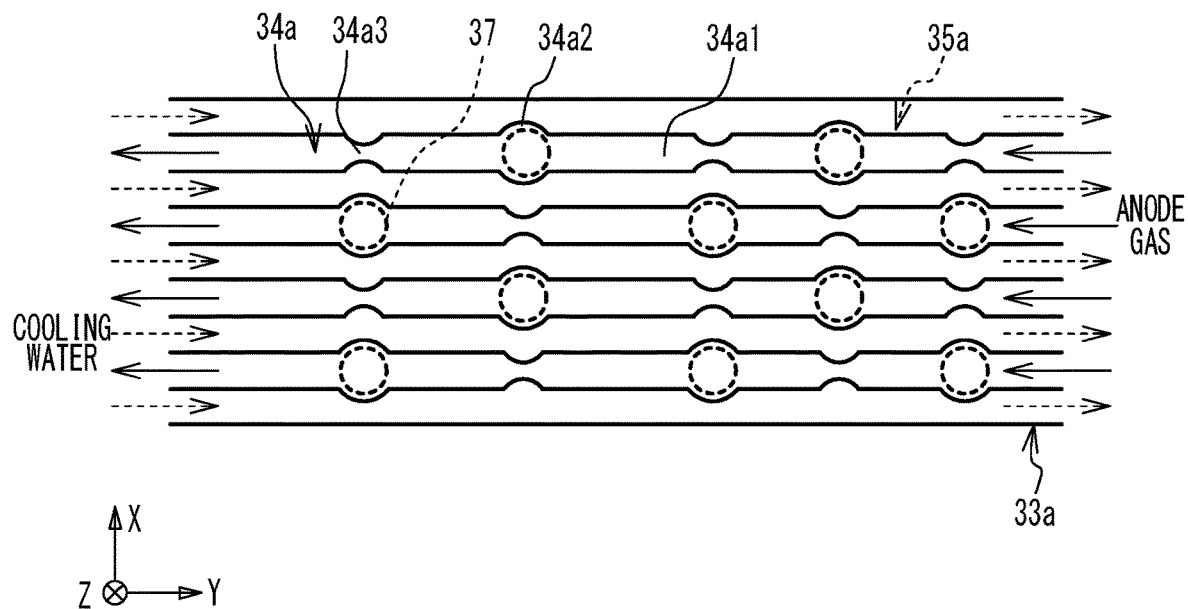
FIGS. 4A and 4B are explanatory views of separators in the first variation, respectively.
Figure 4B:
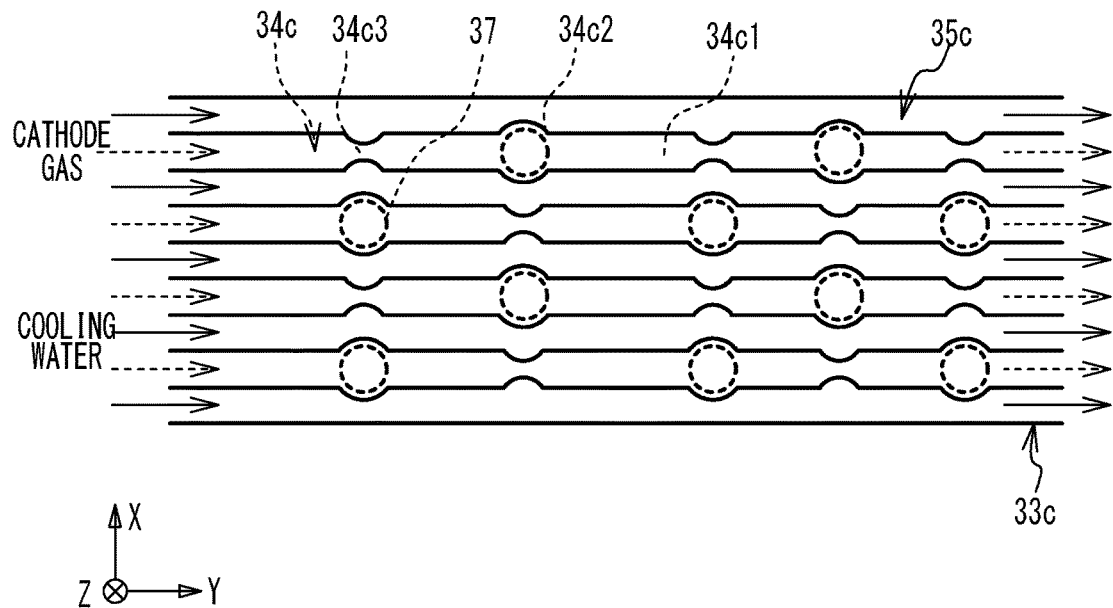

Next, variations will be described. In the variations, the same reference numerals are given to the same components as those in the above embodiment, and duplicated explanation is omitted. FIGS. 4A and 4B are explanatory views of the separators 33a and 33c in the first variation, respectively. FIGS. 4A and 4B correspond to FIGS. 2A and 2B, respectively. As illustrated in FIGS. 4A and 4B, all of the wide portions 34a2 and 34c2 are joined by the joining portions 37. This makes it possible to further ensure the joining strength between the separators 33a and 33c and to reduce the electrical contact resistance therebetween, which ensures the power generation performance. The first variation is suitable for a case of desiring to ensure the joining strength between the separators 33a and 33c and to secure the power generation performance of the stack 1, rather than to simplify the joining process.

Figure 5A:
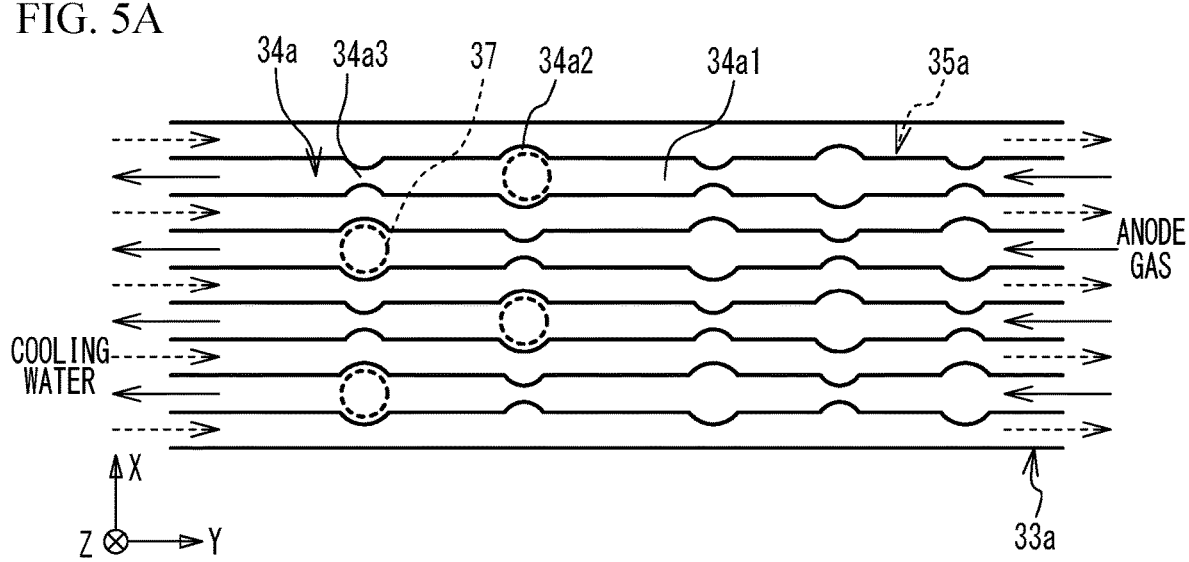
FIGS. 5A and 5B are explanatory views of separators in the second variation, respectively.
Figure 5B:
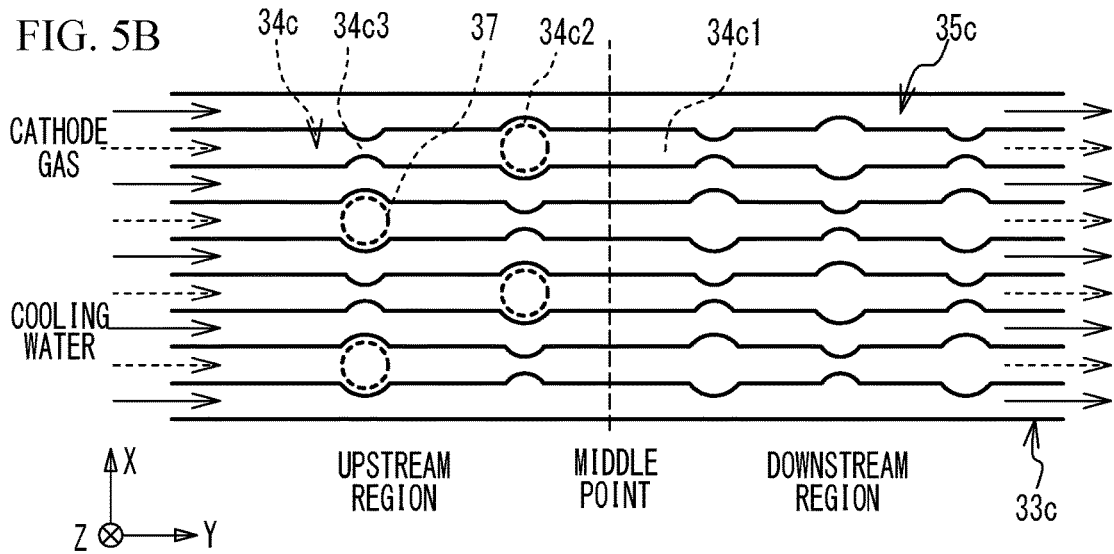

FIGS. 5A and 5B are explanatory views of the separators 33a and 33c in the second variation, respectively. FIGS. 5A and 5B correspond to FIGS. 2A and 2B, respectively. As illustrated in FIG. 5B, the cathode groove portion 34c includes: an upstream region positioned in an upstream side of the cathode gas with respect to a middle point bisecting a length of the cathode groove portion 34c; and a downstream region positioned in a downstream side of the cathode gas with respect to the middle point. All the wide portions 34c2 positioned in the upstream region are joined to the respective wide portions 34a2 by the joining portions 37. All the wide portions 34c2 positioned in the downstream region are not joined to the respective wide portions 34a2. That is, the total number of the wide portions 34c2 joined to the anode groove portions 34a is greater in the upstream region than in the downstream region. The joining points of the separators 33a and 33c are reduced in such a way, thereby simplifying the joining process between the separators 33a and 33c and thereby suppressing the production cost. Additionally, some of the wide portions 34a2 provided in one of the two adjacent anode groove portions 34a are examples of other wide portions in which the groove width of one of the two adjacent anode groove portions 34a is partially increased. Some of the narrow portions provided in the other of the two adjacent anode groove portions 34a are examples of other narrow portions in which the other of the two adjacent anode groove portions 34a is partially decreased. Some of the narrow portions 34a3 provided in one of the two adjacent anode groove portions 34a are examples of other narrow portions in which the groove width of one of the two adjacent anode groove portions 34a is partially decreased. Some of the wide portions provided in the other of the two adjacent anode groove portions 34a are examples of other wide portions in which the groove width of the other of the two adjacent anode groove portions 34a is partially increased.

Figure 5C:
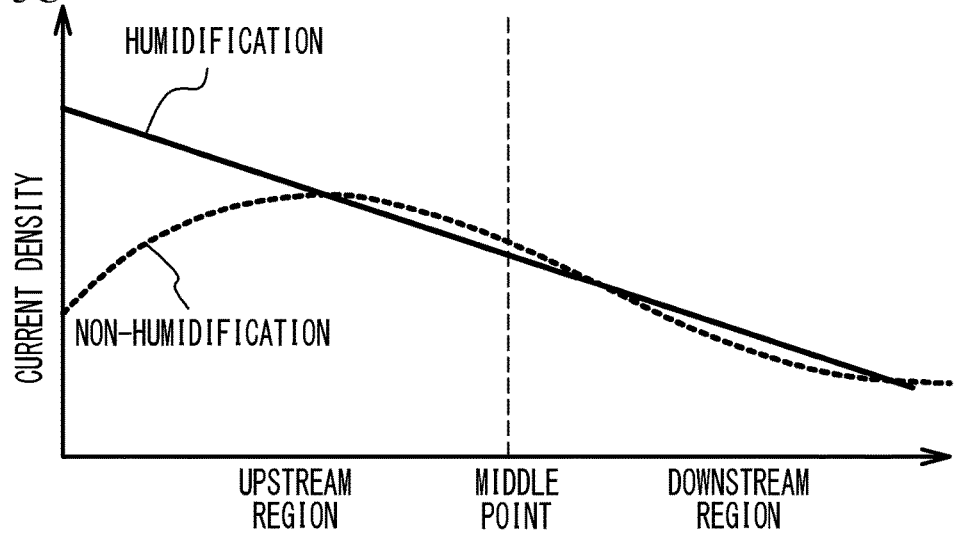
FIG. 5C is a graph illustrating distribution of current density of the fuel cell according to a position in the flowing direction of cathode gas.

FIG. 5C is a graph illustrating the distribution of the current density of the fuel cell according to the position in the flowing direction of the cathode gas. In FIG. 5C, a solid line indicates the current density of the fuel cell supplied with the cathode gas humidified by a humidifier, and a dotted indicates the current density of the fuel cell supplied with the cathode gas not humidified by the humidifier. When the humidified cathode gas is supplied to the fuel cell, since the partial pressure of the cathode gas in the upstream region is higher, the cathode gas is further supplied to the catalyst layer 12c on the cathode side in the upstream region. Thus, the high current density is obtained and the partial pressure of the cathode gas decreases toward the downstream region, so that the current density gradually decreases. Also, the moisture generated by the power generation reaction inhibits the diffusivity of the cathode gas, so that the current density gradually decreases toward the downstream region. When the non-humidified cathode gas is supplied to the fuel cell, the electrolyte membrane 11 is dried, and then the current density is low at the upstream end of the upstream region, but the moisture generated by the power generation reaction can eliminate the drying of the electrolyte membrane 11 in the upstream region, so that the current density can rise. In a region from a slightly upstream side with respect to the middle point to the downstream region, the current density decreases toward the downstream region, like the case of suppling the humidified cathode gas to the fuel cell. In either case, the current density tends to be higher in the upstream region of the cathode gas than in the downstream region thereof. Therefore, in the second variation, the separators 33a and 33c are joined by the joining portions 37 in the upstream region of the cathode gas on the separator 33c with a relatively high current density in the fuel cell, which reduces the electrical contact resistance between the separators 33a and 33c in the position where the current density is high. It is thus possible to suppress deterioration in power generation performance. In the above manner, the joining process is simplified and the producing cost is suppressed, and the power generation performance is also ensured in the second variation.

In the second variation, the separators 33a and 33c are not joined in the downstream region, but they may be joined at a portion where the wide portions 34a2 and 34c2 are in contact with each other in the downstream region. That is, the number of joining points is any number that is larger in the upstream region of the cathode gas than in the downstream region thereof. The large number of joining points in the upstream region of the cathode gas with a high current density effectively suppresses the electrical contact resistance between the separators 33a and 33c in the upstream region. Further, in a case where the wide portions 34a2 and 34c2 are formed in the upstream regions of two separators but not in the downstream region, the two separators may be joined on the wide portions 34a2 and 34c2 in the upstream region. Also in this case, since the two separators are joined in the upstream region of the cathode gas with a high current density, it is possible to effectively suppress the electrical contact resistance between the two separators.

In the first and second variations described above, the groove widths of the wide portions 34a2 and 34c2 are the same, the groove widths of the constant width portions 34a1 and 34c1 are also the same, and the groove widths of the narrow portions 34a3 and 34c3 are the same. However, the present disclosure is not limited thereto. The groove widths of the wide portions 34a2 and 34c2 may differ from each other. The groove widths of the constant width portions 34a1 and 34c1 may differ from each other. The groove widths of the narrow portions 34a3 and 34c3 may differ from each other. For example, the groove width of the cathode groove portion 34c to which the wide portion 34a2 of the anode groove portion 34a is joined is any that is larger than a groove width of a part of the anode groove portion 34a other than the wide portion 34a2 thereof. This ensures an area of a part, joined to the cathode groove portion 34c, of the wide portion 34a2 in which the groove width of the anode groove portion 34a is partially increased. The groove width of the anode groove portion 34a to which the wide portion 34c2 of the cathode groove portion 34c is joined may be larger than a groove width of a part of the cathode groove portion 34c other than the wide portion 34c2 thereof. In this case, it is possible to ensure an area of a part, joined to the anode groove portion 34a, of the wide portion 34c2 in which the groove width of the cathode groove portion 34c is partially increased.

Figure 6:
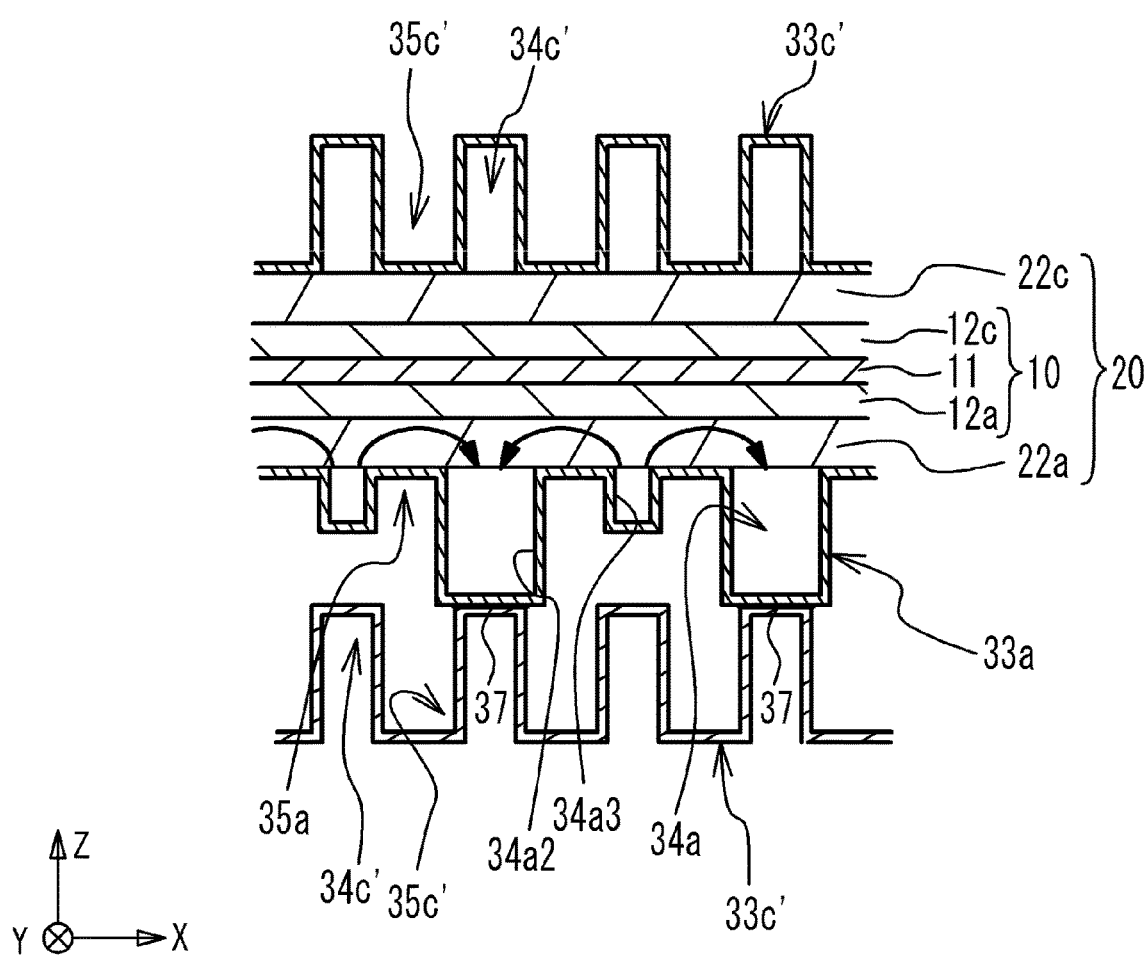
FIG. 6 is an explanatory view of a unit cell in the third variation.

FIG. 6 is an explanatory view of a unit cell in the third variation. FIG. 6 corresponds to FIG. 3B of the embodiment described above. In the third variation, a separator 33c' is used instead of the separator 33c described above. Unlike the separator 33c, a cathode groove portion 34c' of the separator 33c' is not provided with the wide portion 34c2 or the narrow portion 34c3, and extends linearly with a constant groove width. The groove width of the cathode groove portion 34c' is smaller than that of the wide portion 34a2 of the anode groove portion 34a and greater than that of the narrow portion 34a3. That is, in the wide portion 34a2 of the anode groove portion 34a and the cathode groove portion 34c' joined to each other by the joining portion 37, the groove width of the wide portion 34a2 is equal to or greater than that of the cathode groove portion 34c'. That is, the groove width of the wide portion 34a2 is greater than that of a part of the cathode groove portion 34c' to which the wide portion 34a2 is joined. It is thus possible to ensure a joining area at least by the groove width of the cathode groove portion 34c'. With such a configuration, it is possible to suppress the pressure loss of the cooling water while ensuring the joining strength between the separators 33a and 33c', and to suppress the electrical contact resistance therebetween. Since the wide portion 34a2 and the narrow portion 34a3 of the separator 33a are adjacent to each other as described above, the diffusibility of the anode gas is also ensured.

The third variation exemplifies the case where the separator 33c' including the cathode groove portion 34c' with the constant groove width is joined to the separator 33a including the wide portions 34a2 and the narrow portions 34a3. However, for example, a separator including an anode groove portion with a constant groove width may be joined to the separator 33c including the wide portions 34c2 and the narrow portions 34c3 described above. Also in this case, it is possible to suppress the pressure loss of the cooling water while ensuring the joining strength between both separators.

Figure 7A:
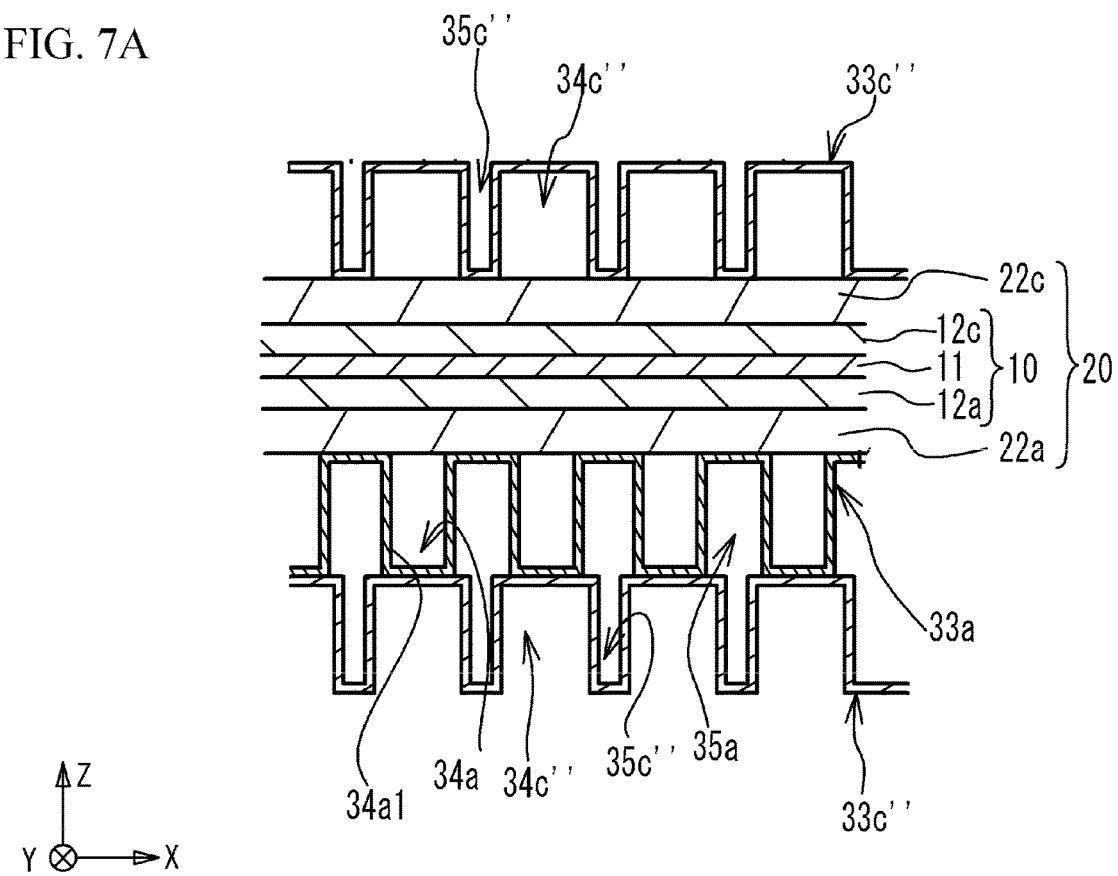
FIGS. 7A and 7B are explanatory views of a unit cell in the fourth variation.
Figure 7B:
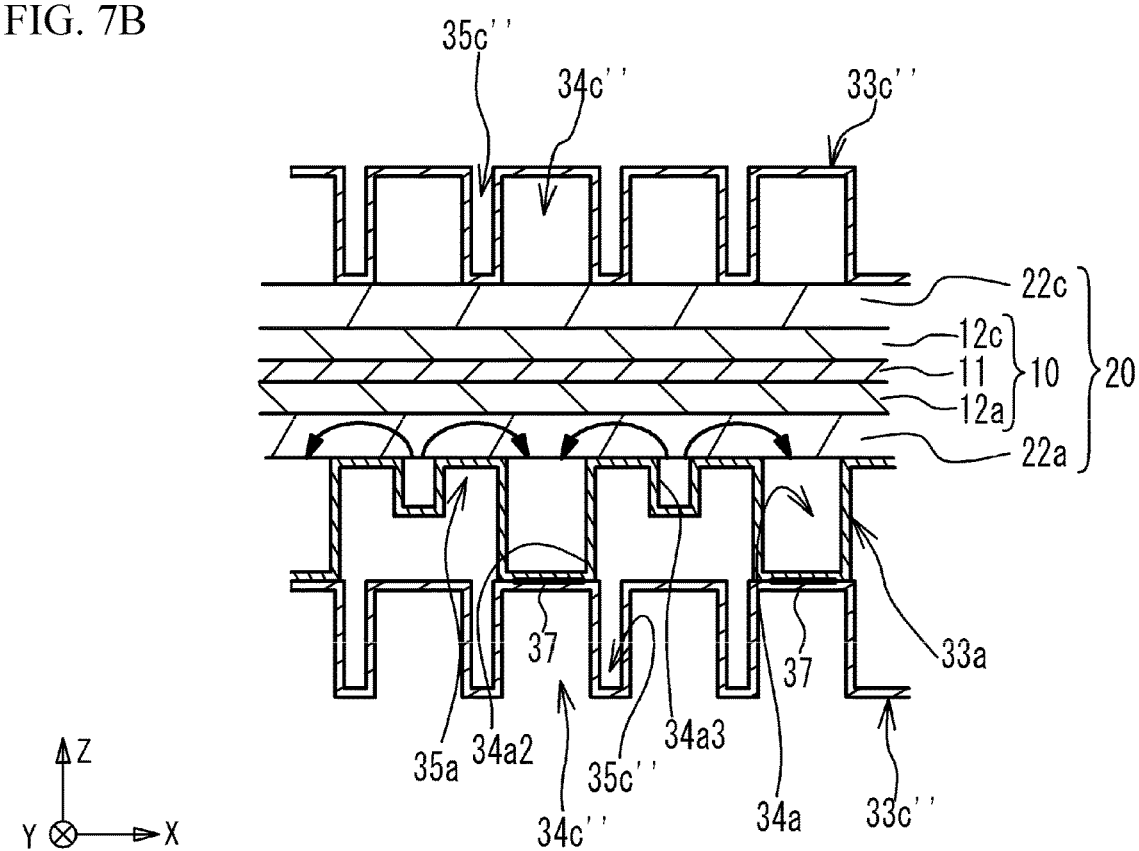

FIGS. 7A and 7B are explanatory views of a unit cell in the fourth variation. FIGS. 7A and 7B correspond to FIGS. 3A and 3B, respectively. In the fourth variation, a separator 33c'' is used instead of the separator 33c described above. Unlike the separator 33c, a cathode groove portion 34c'' of the separator 33c'' is not provided with the wide portion 34c2 or the narrow portion 34c3, but extends linearly with a constant groove width. The groove width of the cathode groove portion 34c'' is greater than any groove width of the constant width portion 34a1, the wide portion 34a2, and the narrow portion 34a3 of the anode groove portion 34a. In other words, a groove width of a part of the cathode groove portion 34c'' to which the wide portion 34a2 of the anode groove portion 34a is joined is greater than that of a part of the anode groove portion 34a other than the wide portion 34a2 thereof. It is therefore possible to ensure an area of a part, joined to the cathode groove portion 34c'', of the wide portion 34a2 in which the groove width of the anode groove portion 34a is partially increased. In this manner, the groove width of the wide portion 34a2 of the anode groove portion 34a is not always greater than that of the cathode groove portion 34c'' as long as the groove width of the cathode groove portion 34c'' is sufficiently great.

The fourth variation exemplifies the case where the separator 33c'' including the cathode groove portion 34c'' with the constant groove width is joined to the separator 33a including the wide portions 34a2 and the narrow portions 34a3. However, for example, a separator including an anode groove portion with a constant groove width may be joined to the separator 33c including the wide portions 34c2 and the narrow portions 34c3 described above. Also in this case, the groove width of a part of the anode groove portion to which the wide portion 34c2 of the cathode groove portion 34c is joined may be greater than that of a part of the cathode groove portion 34c other than the wide portion 34c2 thereof. It is possible to ensure an area of a part, joined to the anode groove portion, of the wide portion 34c2 in which the groove width of the cathode groove portion 34c is partially increased.

Although some embodiments of the present disclosure have been described in detail, the present disclosure is not limited to the specific embodiments but may be varied or changed within the scope of the present disclosure as claimed.

As illustrated in FIG. 2A and the like, the single anode groove portion 34a of the separator 33a is provided with the wide portion 34a2 and the narrow portion 34a3, but not limited thereto. For example, one of the two adjacent anode groove portions 34a may be provided with the wide portion 34a2 but not with the narrow portion 34a3, and the other anode groove portion may be provided with the narrow portion 34a3 but not with the wide portion 34a2. The same applies to the cathode groove portion 34c of the separator 33c. Additionally, the wide portion 34a2 may be provided only in one anode groove portion, and the narrow portion 34a3 may be provided only in an anode groove portion adjacent thereto. The same applies to the cathode groove portion 34c of the separator 33c.

The separators in the embodiment and the variations described above are so-called parallel groove types, but may be serpentine types.

The separators 33a and 33c in the embodiment and the variations described above may be used as a separator of a redox flow fuel cell. Although the cathode solution as the second reaction fluid is supplied to the cathode side in this case, it is possible to ensure the joining strength between the separators 33a and 33c and to suppress the pressure loss of the coolant.

In the separators illustrated in FIGS. 3A, 3B, 6, 7A, and 7B, both side surfaces defining each groove portion are bent at right angles to the bottom surface or the upper surface, but the present disclosure is not limited thereto. They may be gently bent obliquely to the bottom surface or the upper surface.

What is claimed is:
1. A fuel cell stack comprising:
a membrane electrode assembly; and
first and second separators joined to each other,
wherein
the membrane electrode assembly and the first and second separators are stacked,
the first separator includes:
a first coolant groove portion along which coolant flows on a side of the second separator facing the first separator; and
first and second fluid groove portions along which a first reaction fluid flows on a side opposite to the second separator facing the first separator, the first and second fluid groove portions being adjacent to each other through the first coolant groove portion and extending along the first coolant groove portion,
the second separator includes:

a second coolant groove portion along which the coolant flows on a side of the first separator facing the second separator; and third and fourth fluid groove portions along which a second reaction fluid flows on a side opposite to the first separator facing the second separator, and the third and fourth fluid groove portions being adjacent to each other through the second coolant groove portion and extending along the second coolant groove portion, the first and third fluid groove portions face each other in a stacking direction in which the membrane electrode assembly and the first and second separators are stacked, the second and fourth fluid groove portions face each other in the stacking direction, the first and second coolant groove portions face each other in the stacking direction and define a common coolant flow path, the first fluid groove portion includes a wide portion in which a groove width of the first fluid groove portion is partially increased, the second fluid groove portion includes a narrow portion in which a groove width of the second fluid groove portion is partially decreased, the wide portion of the first fluid groove portion is joined to the third fluid groove portion, a groove width of a part of the third fluid groove portion joined to the wide portion of the first fluid groove portion is greater than a groove width of a part of the first fluid groove portion other than the wide portion of the first fluid groove portion, and the wide portion of the first fluid groove portion is adjacent to the narrow portion of the second fluid groove portion through the first coolant groove portion.

2. The fuel cell stack of claim 1, wherein a groove width of the wide portion of the first fluid groove portion is equal to or greater than the groove width of the part of the third fluid groove portion joined to the wide portion of the first fluid groove portion.

3. The fuel cell stack of claim 1, wherein the narrow portion of the second fluid groove portion is shallower than a part of the second fluid groove portion other than the narrow portion of the second fluid groove portion.

4. The fuel cell stack of claim 1, wherein the first fluid groove portion includes a narrow portion in which the groove width of the first fluid groove portion is partially decreased, the second fluid groove portion includes a wide portion in which the groove width of the second fluid groove portion is partially increased, and the wide portion of the second fluid groove portion is adjacent to the narrow portion of the first fluid groove portion through the first coolant groove portion.

5. The fuel cell stack of claim 4, wherein the narrow portion of the first fluid groove portion is shallower than a part of the first fluid groove portion other than the narrow portion of the first fluid groove portion.

6. The fuel cell stack of claim 1, wherein the third fluid groove portion includes a wide portion in which a groove width of the third fluid groove portion is partially increased, the fourth fluid groove portion includes a narrow portion in which a groove width of the fourth fluid groove portion is partially decreased, the part of the third fluid groove portion joined to the wide portion of the first fluid groove portion is the wide portion of the third fluid groove portion, and the wide portion of the third fluid groove portion is adjacent to the narrow portion of the fourth fluid groove portion through the second coolant groove portion.

7. The fuel cell stack of claim 1, wherein the wide portions of the first fluid groove portion are provided, the narrow portions of the second fluid groove portion are provided, all of the wide portions of the first fluid groove portion are joined to the third fluid groove portion, each of the groove widths of parts of the third fluid groove portion respectively joined to the wide portions of the first fluid groove portion is greater than the groove width of the part of the first fluid groove portion other than the wide portions of the first fluid groove portion, and the wide portions of the first fluid groove portion are respectively adjacent to the narrow portions of the second fluid groove portion through the first coolant groove portion.

8. The fuel cell stack of claim 4, wherein the narrow portions of the first fluid groove portion are provided, the wide portions of the second fluid groove portion are provided, all of the wide portions of the second fluid groove portion are joined to the fourth fluid groove portion, each of groove widths of parts of the fourth fluid groove portion respectively joined to the wide portions of the second fluid groove portion is greater than a groove width of a part of the second fluid groove portion other than the wide portions of the second fluid groove portion, and the wide portions of the second fluid groove portion are respectively adjacent to the narrow portions of the first fluid groove portion through the first coolant groove portion.

9. The fuel cell stack of claim 1, wherein the first reaction fluid is anode gas, the second reaction fluid is cathode gas, the third and fourth fluid groove portions include:
an upstream region positioned in an upstream side of the cathode gas with respect to a middle point bisecting a length of the third or fourth fluid groove portion in an extending direction of the third and fourth fluid groove portions, and
a downstream region positioned in a downstream side of the cathode gas with respect to the middle point, and the wide portion of the first fluid groove portion is joined to the upstream region.

10. The fuel cell stack of claim 4, wherein the first reaction fluid is anode gas, the second reaction fluid is cathode gas, the third and fourth fluid groove portions include:
an upstream region positioned in an upstream side of the cathode gas with respect to a middle point bisecting a length of the third or fourth fluid groove portion in an extending direction of the third and fourth fluid groove portions, and
a downstream region positioned in a downstream side of the cathode gas with respect to the middle point, and the wide portion of the first fluid groove portion and the wide portion of the second fluid groove portion are joined to the upstream region.

11. The fuel cell stack of claim 9, wherein the first fluid groove portion includes other wide portions in which the groove width of the first fluid groove portion is partially increased, the second fluid groove portion includes other narrow portions in which the groove width of the second fluid groove portion is partially decreased, the other wide portions of the first fluid groove portion are respectively adjacent to the other narrow portions of the second fluid groove portion through the first coolant groove portion, at least any one of the other wide portions of the first fluid groove portion is joined to the third fluid groove portion, and a total number, of the wide portion of the first fluid groove portion joined to the third fluid groove portion, and the other wide portions of the first fluid groove portion joined to the third fluid groove portion, is greater in the upstream region than in the downstream region.

12. The fuel cell stack of claim 10, wherein the first fluid groove portion includes other narrow portions in which the groove width of the first fluid groove portion is partially decreased, the second fluid groove portion includes other wide portions in which the groove width of the second fluid groove portion is partially increased, the other wide portions of the second fluid groove portion are respectively adjacent to the other narrow portions of the first fluid groove portion through the first coolant groove portion, at least any one of the other wide portions of the second fluid groove portion is joined to the fourth fluid groove portion, and a total number, of the wide portion of the first fluid groove portion joined to the third fluid groove portion, the wide portion of the second fluid groove portion joined to the fourth fluid groove portion, and the other wide portions of the second fluid groove portion joined to the fourth fluid groove portion, is greater in the upstream region than in the downstream region.

13. The fuel cell stack of claim 4, wherein the wide portions of the first fluid groove portion are provided, the narrow portions of the second fluid groove portion are provided, the narrow portions of the first fluid groove portion are provided, the wide portions of the second fluid groove portion are provided, the wide portions of the first fluid groove portion are respectively adjacent to the narrow portions of the second fluid groove portion through the first coolant groove portion, the narrow portions of the first fluid groove portion are respectively adjacent to the wide portions of the second fluid groove portion through the first coolant groove portion, the wide portions of the first fluid groove portion and the narrow portions of the first fluid groove portion are alternately provided in an extending direction of the first fluid groove portion, and the wide portions of the second fluid groove portion and the narrow portions of the second fluid groove portion are alternately provided in an extending direction of the second fluid groove portion.

* * * * *